Sept. 13, 1960 D. FRIEDMAN ET AL 2,952,158
PHOTOSENSITIVE CELL SUPPORT
Filed Feb. 28, 1955
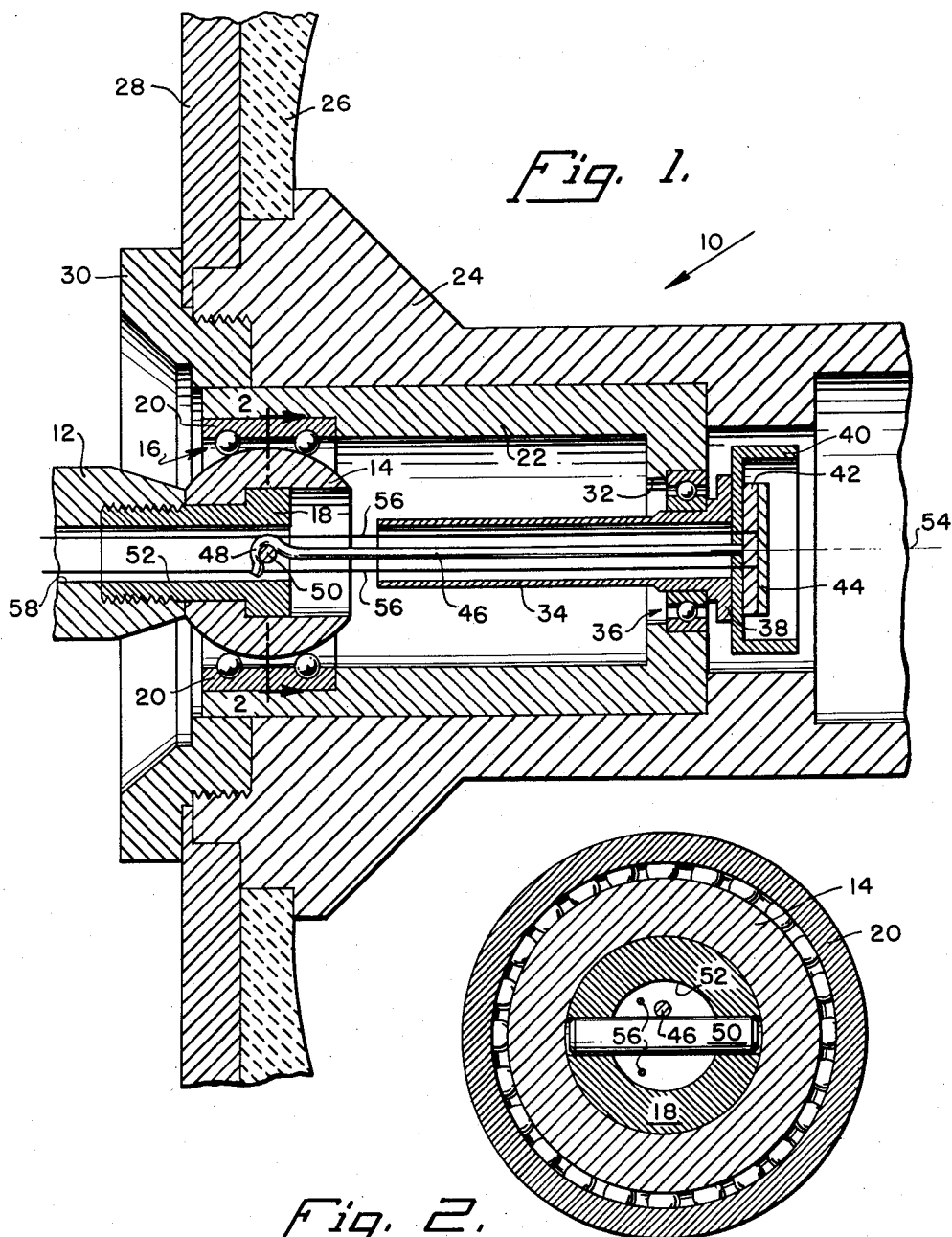
INVENTORS
DONALD FRIEDMAN
BERNARD L. SANDBERG
BY
ATTORNEYS

United States Patent Office

2,952,158
Patented Sept. 13, 1960

2,952,158

PHOTOSENSITIVE CELL SUPPORT

Donald Friedman, Oakland, and Bernard L. Sandberg, Paramus, N.J., assignors, by mesne assignments, to the United States of America as represented by the Secretary of the Navy Filed Feb. 28, 1955, Ser. No. 491,239

2 Claims. (Cl. 74—5)

This invention relates to target seeking gyroscopes, or target seekers, and in particular to improved means for mounting the photo-sensitive material of such a seeker.

In U.S. patent application Serial No. 337,899, filed February 19, 1953, and now abandoned, entitled Target Seeking Gyro, by William B. McLean, there is disclosed one form of such a seeker. In previous forms of such seekers the photosensitive element, or photocell, used to produce a target signal, an electrical signal whose phase is a function of the deviation of a target from the axis of rotation of the rotor of the gyroscope of the seeker, has been fixedly mounted on the support means of such a rotor with the photosensitive material mounted so as to be normal to the axis of rotation of the gyro and to the radiation which is focused on the photosensitive material by the optical means of the seeker only when the axis of rotation of the gyro rotor has one particular orientation, which orientation generally is parallel to the longitudinal axis of the missile in which the seeker is adapted to be mounted.

When the seeker is tracking a target, the axis of rotation of the rotor of the gyro in most instances is precessed from its initial, or caged, position so that the axis of rotation of the rotor is not parallel to the longitudinal axis of the missile. When the gyro is precessed from its initial position, the radiation focused on the photosensitive material is not normal to the photocell. This reduces the magnitude of the signal produced by the photocell for a given intensity of the incident radiation. Since the magnitude of the target signal determines the maximum range at which the seeker can detect a target, it is therefore very important that the strength of the target signal be maximized.

It is therefore an object of this invention to provide an improved cell support for the photosensitive material which will hold the material so that it is normal to the axis of rotation of the rotor of the gyroscope of the seeker irrespective of the orientation of the gyro rotor.

Other objects and many of the attendant advantages of this invention will be readily appreciated as the same become better understood by reference to the following detailed description when considered in connection with the accompanying drawing wherein:

Fig. 1 is a broken away central section through a target seeking gyroscope and

Fig. 2 is a section taken on line 2—2 of Fig. 1.

Referring to Fig. 1, the rotor 10 of a target seeking gyro, or seeker, is mounted on post 12, which is adapted to be fixedly secured to a missile, which is not illustrated, in which the seeker is adapted to be mounted. Inner race 14, which has a spherical outer surface, of universal bearing 16 is secured to post 12 by bolt 18. The outer race 20 of bearing 16 is mounted in one end of inner sleeve 22 of rotor 10. This type of mounting of rotor 10 on bearing 16, permits rotor 10 to be precessed with two degrees of freedom and to be rotated about an axis of rotation. Outer sleeve 24 of rotor 10 is press fitted over inner sleeve 22 and supports a primary first surface spherical reflecting mirror 26, permanent magnet 28, and counter balance 30. Counter balance 30 statically and dynamically balances rotor 10 and immovably secures mirror 26, magnet 28 and sleeve 24 together.

Inner sleeve 22 has an opening 32 of reduced diameter formed in one end. Tubular support member 34 is centrally positioned within opening 32 of inner sleeve 22 by ball bearing 36. The enlarged end 38 of member 34 has light shade 40 permanently secured to it. Support disc 42 is fixedly secured to shade 40 and the photosensitive material 44 which forms a photocell is mounted on disc 42. Support member 34 is pivotally but non-rotatably mounted with respect to post 12 by means of rod 46 which has one end fixedly secured to shade 40 and its hook end 48 which fits around pin 50. Pin 50 is mounted in bore 52 of bolt 18 so that it passes through the center of curvature of the spherical surface of inner race 14 which point is also the center of movement of rotor 10 with respect to post 12, and at right angles to the longitudinal axis 54 of post 12. Insulated conductors 56 extend through the longitudinal bore 58 of post 12, bore 52 of bolt 18, and the inside of tubular support member 34 to photocell 44. The other ends of conductors 56 are connected to a conventional electrical circuit, which is not illustrated for converting the variations of the electrical impedance of photocell 44 due to variations in the intensity of the incident radiation on photocell 44 into the target signal. In a preferred example, photocell 44 is made of lead sulphide.

Before the seeker is used to track a target which is a source of radiant energy, for example, rotor 10 is caged and brought up to the desired angular velocity by conventional caging means and a motor, which have not been illustrated since they do not form a part of the invention. The caging means holds rotor 10 so that its axis of rotation substantially coincides with the longitudinal axis 54 of post 12. In most applications the longitudinal axis 54 of post 12 also coincides with the longitudinal axis of the missile in which the seeker is adapted to be mounted. A target is acquired when the target's image is focused on photocell 44 by the optical means which form a portion of rotor 10. The rotor 10 is then uncaged and the seeker will be precessed by means, which are not illustrated since they do not form a part of this invention, so that the target substantially always lies on the axis of rotation of rotor 10. As rotor 10 spins about its axis of rotation, tubular support member 34 does not rotate with respect to the axis of rotation of rotor 10 or with respect to axis 54 of post 12 because it is mounted by bearing 36 within inner sleeve 22 and because the hook 48 and pin 50 resist any slight torque that might be transmitted to support member 34 through bearing 36. This particular form of mounting means, however, maintains photocell 44 normal to the axis of rotation of the rotor 10 throughout the range of angles through which rotor 10 is designed to be precessed, in a preferred example this is 20°. Since the optical means of the seeker focuses the incident radiation so that it is also substantially parallel to the axis of rotation of the gyro rotor, it is seen that at all times photocell 44 will be normal to the incident radiation as well as to the axis of rotation of gyro rotor 10.

Obviously modifications and variations of the present invention are possible in the light of the above teachings. It is, therefore, to be understood that within the scope of the appended claims the invention may be practiced otherwise than as specifically described.

What is claimed is:

1. In a target seeking gyro having a rotor, said rotor having an inner hollow sleeve, the improvements comprising a post having a longitudinal bore, a universal bearing having an inner spherical race, means for securing the inner race to the post, said rotor being mounted by means of its inner sleeve and the universal bearing on said post for rotation about an axis of rotation and for precession with two degrees of freedom, ball bearings, a tubular support member, said support member being positioned within the inner sleeve by the ball bearings, a photocell, mounting means for securing the photocell to the support member, a pin, means for mounting the pin within the inner race of the universal bearing so that said pin passes through the center of movement of the gyro rotor and at right angles to the longitudinal axis of the post, a rod, one end of the rod being secured to the support member, a hook formed in the other end of the rod, said hook being placed around said pin.

2. In a target seeking gyro having a post having a longitudinal bore, a universal bearing having an inner spherical race, a bolt having a bore therethrough securing the inner race to the post, a rotor having a central bore, and a photosensitive cell, said rotor being mounted by said universal bearing on said post for rotation about an axis of rotation and for precession with two degrees of freedom, the improvements comprising a hollow tubular support member rotatably mounted in relation to and within the central bore of the rotor, a light shade secured to said member, a support disc secured to said shade, the photosensitive cell being secured to the support disc, a rod, one end of the rod being secured to the shade, the other end of the rod being a hook formed therein, a pin, said pin being mounted in said bolt so as to pass through the center of movement of the gyro rotor and at right angles to the longitudinal axis of the post, the hook formed in the rod being positioned around said pin.

References Cited in the file of this patent

UNITED STATES PATENTS

| | | |
|---|---|---|
| 1,179,439 | Leavitt | Apr. 18, 1916 |
| 1,480,637 | Schuler | Jan. 15, 1924 |
| 2,378,744 | Annen | June 19, 1945 |

FOREIGN PATENTS

| | | |
|---|---|---|
| 430,237 | Italy | Feb. 12, 1948 |